(No Model.)
S. H. PHELPS.
BICYCLE.
No. 592,122. Patented Oct. 19, 1897.
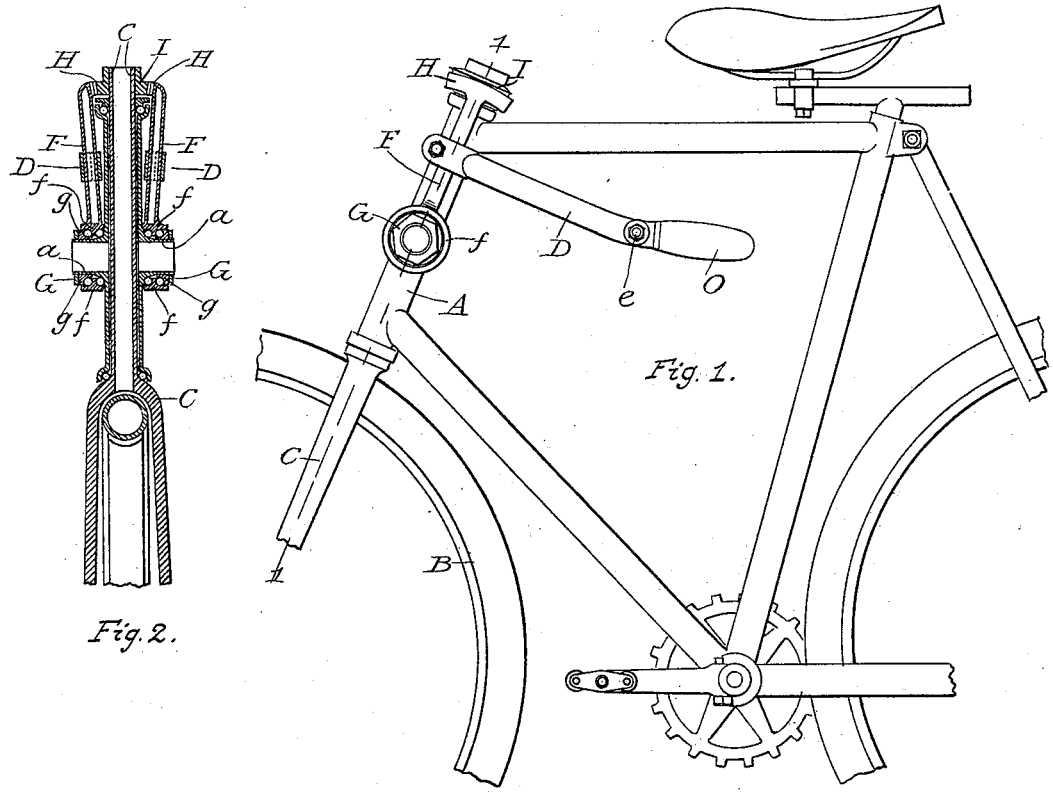
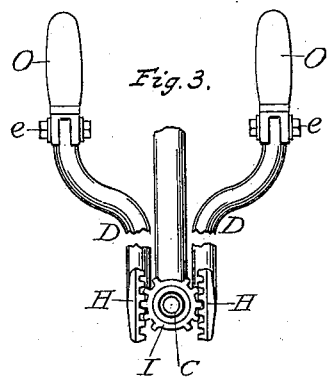
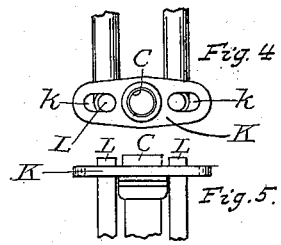
Witnesses.
Fred. J. Lawrence
Spencer H. Phelps, Inventor.
by Robert W. Hardie, Atty.

UNITED STATES PATENT OFFICE.

SPENCER H. PHELPS, OF JANESVILLE, WISCONSIN.

BICYCLE.

SPECIFICATION forming part of Letters Patent No. 592,122, dated October 19, 1897.

Application filed June 4, 1896. Serial No. 594,323. (No model.)

*To all whom it may concern:*

Be it known that I, SPENCER H. PHELPS, a citizen of the United States, residing at Janesville, in the county of Rock and State of Wisconsin, have invented certain new and useful Improvements in Bicycles, of which the following is a specification.

My invention has for its objects to provide a bicycle with means whereby the user is enabled to apply the greatest power with the least exertion, and further to provide means whereby the steering-wheel of the bicycle may be readily controlled. This I accomplish by the means illustrated in the accompanying drawings, in which—

Figure 1 is a side view, partly broken away, of a bicycle embodying my invention. Fig. 2 is a vertical cross-section taken on line 1 1 of Fig. 1. Fig. 3 is a plan view of the upper portion of guiding mechanism. Fig. 4 is a plan view of the upper portion of a modification of guiding mechanism. Fig. 5 is a front view of the parts shown in Fig. 4.

As illustrated in the drawings, A represents the head of a bicycle-frame, within which rotates a steering-bar C, having a steering-wheel B mounted upon said bar in the usual manner.

A circular boss or shoulder $a$ is preferably formed on the sides of the head A, and is provided with grooves or bearings of any suitable construction adapted to support bearing-balls, indicated by the white circular spaces adjacent to said boss or shoulder. (Shown in Fig. 2.) Oscillating arms F are mounted on the head A, preferably by forming circular rings or yokes $f$ on the lower ends of such arms F, and providing such rings or yokes with bearings for the bearing-balls supported on the boss or shoulder $a$. A screw-nut G is preferably used to secure a cone $g$ in place against the bearing-balls and hold the several parts in position. The upper portion of the arms F are preferably provided with a toothed rack H, which engages a toothed pinion I, secured to the upper end of the steering-bar C.

Handle-bars D, extending lengthwise of the frame on both sides thereof, are connected with the steering-bar C by means of the oscillating arms F, to which said handle-bars are secured and are adjustable vertically on said arms. The ends of the handle-bars D are further provided with handles O, which are vertically adjustable on said handle-bars D by means of the bolt $e$. The handle-bars D are extended in length, so that the handles are brought nearly in line with the hips and feet of the user. These handles oscillate in vertical planes and move the steering-bar C in such a manner as to rotate said steering-bar and the steering-wheel B, mounted on said bar. By means of this construction the steering-wheel is guided entirely by the up-and-down movement of the handles, which, being close to the rider and nearly in line with his hips, permit of increased power being applied to the wheel when the user raises or depresses the handle-bars, and a movement of the shoulder of the user sidewise causes an up-and-down movement of the handle-bars, and thereby enables the rider in effect to guide the wheel by the lateral movement of his body.

I do not desire to be limited to the specific construction of the several parts shown herein.

The means by which the handle-bars moving in vertical planes are connected with a laterally-rotating steering-bar may be varied without departing from my invention, and I desire to cover, broadly, any suitable construction or arrangement of parts whereby vertical oscillating handle-bars extending lengthwise of the frame on both sides thereof transmit a laterally-rotating motion to the steering bar and wheel of a bicycle.

In Figs. 4 and 5 I have shown a modification of means for connecting the oscillating arms F with the steering-bar C. In such construction a slotted plate K is attached to the upper end of the steering-bar C and provided with slots $k$, which engage pins L, formed on the upper ends of the arms F.

What I claim is—

1. The combination with a bicycle-frame, of a steering-wheel, a steering-bar, oscillating vertical arms mounted on said frame and connected with said steering-bar, and vertically-oscillating handle-bars extending lengthwise of said frame and connected with said oscillating arms, substantially as shown and described.

2. The combination with a bicycle-frame, of a steering-wheel, a steering-bar, oscillating vertical arms mounted on said frame and connected with said steering-bar, and vertically-oscillating handle-bars adjustable vertically on said oscillating arms and extending lengthwise of said frame, substantially as shown and described.

3. The combination with a bicycle-frame, of a steering-wheel, a steering-bar provided with a toothed pinion, oscillating vertical arms mounted on said frame and provided with toothed racks engaging said pinion, and vertically-oscillating handle-bars extending lengthwise of said frame and connected with said oscillating arms, substantially as shown and described.

In witness whereof I affix my signature in the presence of two witnesses.

SPENCER H. PHELPS.

Witnesses:
WILLIAM G. WHEELER,
JEANNETTE LYNTS.